US005119554A

United States Patent [19]

Wilcox

[11] Patent Number: 5,119,554

[45] Date of Patent: Jun. 9, 1992

[54] PINTAIL EJECTOR ASSEMBLY FOR FASTENER INSTALLATION TOOLING

[75] Inventor: Robert B. Wilcox, Kingston, N.Y.

[73] Assignee: Huck Manufacturing Company, Irvine, Calif.

[21] Appl. No.: 720,347

[22] Filed: Jun. 25, 1991

[51] Int. Cl.[5] .......... B23P 19/04

[52] U.S. Cl. .......... 29/252

[58] Field of Search .......... 29/252; 72/427, 465, 72/273, 328, 344, 351; 254/93 R

[56] References Cited

U.S. PATENT DOCUMENTS 3,180,017 4/1965 Simmons .......... 29/252

4,402,133 9/1983 Cribbs et al. .......... 29/252

*Primary Examiner*—J. J. Hartman

*Attorney, Agent, or Firm*—Harness, Dickey & Pierce

[57] ABSTRACT

An installation tool for pin and collar fastener assemblies includes an ejector rod slidably mounted in an axial blind bore in the actuator portion of the tool. Within the blind end of the axial bore is an elongated resilient bumper adapted to engage the ejector rod to absorb momentum and energy associated with high speed movement of a severed pintail. The resilient bumper minimizes shock loading of the ejector rod and thereby prolongs the ejector rod service life.

7 Claims, 1 Drawing Sheet

PINTAIL EJECTOR ASSEMBLY FOR FASTENER INSTALLATION TOOLING

BACKGROUND OF THE INVENTION

1. Field of the Invention

This invention relates in general to a tool for assembling fastener pins and fastener collars on workpieces, and particularly relates to an assembly for expelling spent or severed pintails from the interior of the tool.

2. Description of Prior Developments

A known fastener system marketed by Huck Manufacturing Company under the tradename HUCKBOLT includes a headed fastener pin having a number of axially spaced circumferential grooves formed therein. The pin is adapted to extend through aligned holes in a pair of facially engaged workpieces so that the head of the pin is engaged against one face of the workpiece assembly and the grooved portion of the pin extends beyond the other face of the workpiece assembly. A fastener collar is placed over the grooved portion of the pin, after which a fastener tool is operated to swage the collar into the circumferential grooves. The workpiece assembly is thus sandwiched between the head of the pin and the fastener collar.

The collar-swaging operation is performed with a reciprocating tool that includes a pin puller jaw mechanism movable in one direction, and an annular anvil movable in the opposite direction so that the anvil can move over the surface of the fastener collar to radially compress the collar material into the circumferential grooves in the fastener pin.

The fastener pin has a relatively deep break neck groove that forms a weak point at an intermediate point along the pin length. As the anvil completes the swaging stroke the pin puller jaw mechanism exerts an increased axial force on the pin so that the pin breaks at the break neck groove. As the pin breaks, the pin puller jaw mechanism moves rapidly away from the main body portion of the pin to carry the severed stub portion of the pin into a bore extending into the interior space of the tool. The severed pin portion, sometimes termed a pintail, develops significant axial momentum as it travels with and then separates from the jaw mechanism.

In some tool constructions an ejector mechanism is included for the purpose of absorbing some of the pintail momentum and dislodging and ejecting the pintail from the tool after the pin-severing action. One conventional ejector mechanism includes an elongated rod slidably positioned in a bore in the pin puller actuator structure. A coil spring is arranged in the bore to axially bias the ejector rod toward the open front end of the bore.

The pintail impacts axially against the ejector rod to move it rearwardly into the bore as the coil spring compresses to absorb some of the pintail momentum and energy. The compressed spring then recoils to drive the rod in the reverse direction to eject the pintail from the pin puller jaw mechanism.

During the reciprocating motion of the ejector rod, the interior end of the rod may forcibly strike against an end wall at the bottom of the bore. A considerable impulse or shock force is thereby generated in the rod, leading to a reduced service life and possible fracture of the rod. The present invention is aimed at reducing these shock forces, thereby effectively increasing the service life and reliability of the ejector rod.

SUMMARY OF THE INVENTION

In the practice of this invention the ejector rod is axially shortened so as to avoid direct forcible contact with the interior end wall of the bore. An elongated resilient bumper is positioned within the blind end of the bore in the path of the shortened ejector rod. As the end of the ejector rod strikes the resilient bumper, the bumper material absorbs some of the momentum and energy of the rod as the rod decelerates in a less abrupt fashion so that the shock forces applied to the rod are greatly minimized. The ejector rod thereby enjoys a lengthened service life compared to the prior ejector rods.

In a preferred embodiment of the invention the resilient bumper has a nose portion extending axially within a coil spring to engage the ejector rod before the coil spring is fully compressed. The effect is to minimize stress on the coil spring and to thereby minimize the possibility of premature spring failure.

THE DRAWINGS

DETAILED DESCRIPTION OF THE PREFERRED EMBODIMENTS

Figure 1:
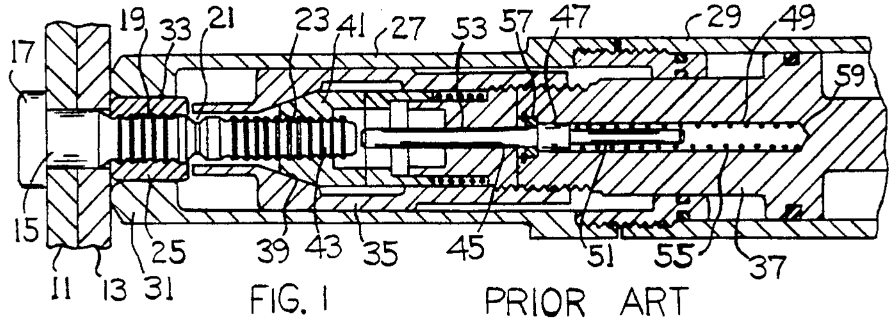
FIG. 1 is a sectional view taken through a prior art fastener tool structure.

FIG. 1 shows a prior art tool for installing a pin-collar fastener on two facially-engaged workpieces 11 and 13. The fastener includes a fastener pin 15 having a head 17 and a grooved shank extending through aligned circular holes in the workpieces. The pin has a series of locking grooves 19, a break neck groove 21 and a series of jaw-engagement grooves 23.

A collar 25 encircles the shank portion of pin 15 to lock the pin relative to workpieces 11 and 13. As shown in FIG. 1, inner surface portions of collar 25 are swaged into grooves 19 to lock the collar to pin 15. The collar and fastener pin head 17 exert clamping forces on the exposed faces of the workpieces.

The installation tool includes an annular anvil housing 27 suitably attached to the cylinder portion 29 of a conventional hydraulic actuator tool. The anvil housing includes a high strength anvil 31 having an inner side surface 33 adapted to ride along the surface of collar 25 to deform and swage the collar material into locking grooves 19 as the anvil moves in a right-to-left direction. FIG. 1 shows the anvil at the end of its motion at completion of the swaging stroke.

A conventional pin puller mechanism is slidably positioned within anvil housing 27 for axial motion in a direction opposite to the anvil housing. The pin puller mechanism includes a tubular collet 35 attached to piston 37 of the hydraulic actuator tool. A frustoconical internal surface 39 on the collet is engageable with convergent outer surfaces of a segmental jaw structure 41 so that rightward motion of piston 37 causes the jaw structure to grip the fastener pin 15 and exert a rightward pulling force on pin 15. At the same time anvil 31 exerts a leftward swaging force on collar 25.

As piston 37 moves rightwardly from its FIG. 1 position it exerts a progressively greater axial force on pin 15 as the anvil 31 abuts and is reacted against the stationary workpieces. The pin breaks at the breakneck groove 21 such that the right end portion or pintail portion 43 of the pin is severed from the pin. When the pin breaks along groove 21 the resistance to piston motion decreases rapidly and the piston and associated pin puller mechanism quickly accelerate rearwardly such that the severed portion 43 of the pin impacts against the end surface of an elongated ejector rod 45.

Ejector rod 45 includes a central slide portion 47 slidably engaged in an axial bore 49 in actuator piston 37. An elongated cylindrical stem 51 extends rightwardly from slide portion 47 within bore 49. A second elongated cylindrical stem 53 extends leftwardly from slide portion 47 toward the space occupied by severed portion 43 of fastener pin 15. A compression coil spring 55 is located within bore 49 to exert a leftward biasing force on rod 45. The rod is prevented from escaping out of the bore by an annular stop 57 suitably mounted in the mouth of the bore.

When pin 15 breaks at groove 21, the collet 35 and jaw structure 41 rapidly retract until the end of the stroke of piston 37. At this point, the jaw structure 41 continues to move rearwardly under its own momentum as the collet remains stationary with the piston. As the jaw structure axially separates from the collet, the jaw structure 41 opens so that severed portion 43 of the pin moves axially out of the jaw structure as the pin abuts against the end of rod 45.

In some cases the rod may be deflected to such an extent by the recoiling pintail that stem 51 impacts against end surface 59 of bore 49. The rod then rebounds leftwardly to propel the severed pin portion 43 leftwardly through the open jaw structure. At this time the apparatus is separated from the work due to the axial forces generated during the collar swaging operation. The net effect is that the severed pin portion is forcibly ejected from the tool.

During the pin setting cycle the impact action of rod 45 against bore end wall surface 59 generates shock forces within the ejector rod. The rod may bend or break after a comparatively few cycles, particularly at the shoulder formed between stem 51 and slide portion 47. Moreover, because spring 55 is typically compressed to its solid height during pintail recoil, spring 55 has a relatively short service life.

Figure 2:
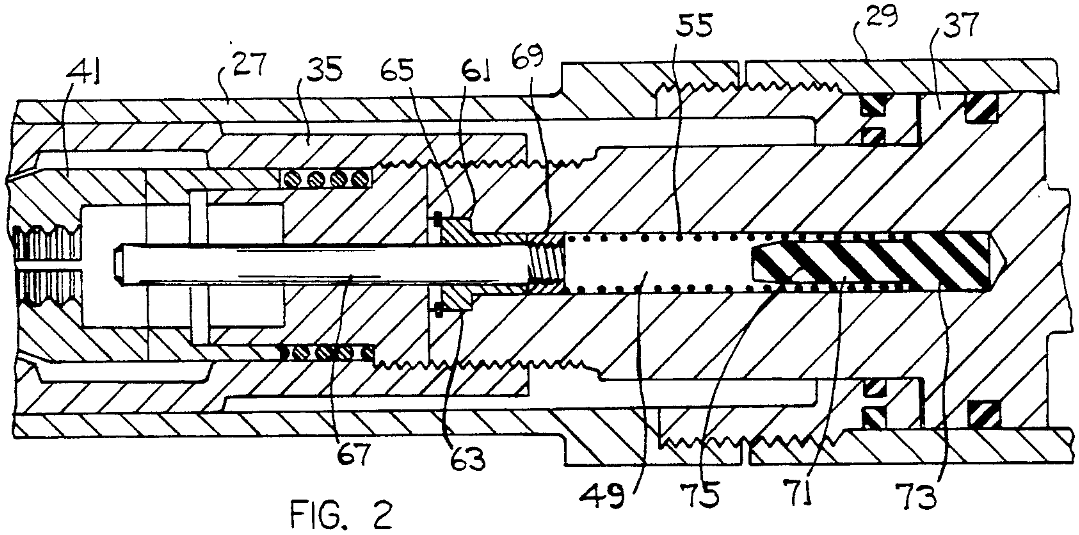
FIG. 2 is a view taken in the same direction as FIG. 1, but showing a tool embodying features of the present invention.

FIG. 2 shows an ejector rod construction designed to have improved service life, compared to the ejector rod shown in FIG. The FIG. 2 apparatus is similar to the FIG. 1 apparatus except for the ejector mechanism. In order to better show features of the improved ejector mechanism, FIG. 2 shows the apparatus in a starting condition prior to initiation of a collar-swaging operation.

The FIG. 2 ejector mechanism includes a stop 61 mounted in the mouth of axial bore 49. The stop includes a guide sleeve having a flange 63 seated in a counterbore 65. An E-ring can be used to retain the sleeve in place. Slidably extending through the guide sleeve is an elongated cylindrical ejector stem 67 having a threaded right end position.

An internally threaded sleeve or collar 69 is threaded onto stem 67 so that stem 67 and sleeve 69 constitute a rigid unitary ejector rod structure slidable back and forth along the axis of bore 49. Sleeve 69 is slidably engaged with the bore side surface to act as a guidance head for the ejector rod.

Located within the bore is an elongated resilient bumper 71 formed preferably of an elastomeric polyurethane material having a Shore A durometer of about ninety. The one-piece resilient bumper has a plug portion 73 seated in bore 49 and an elongated nose portion 75 of reduced diameter extending within and supporting coil spring 55. The axial length of bumper 71 is preferably about half the total length of the ejector rod.

When the pintail or severed pin portion 43 impacts the left end surface of the ejector rod, the rod is driven rightwardly to impact bumper 71. The resilient bumper deflects upon impact with the rod to absorb a significant portion of the momentum and energy of the rod. Nose portion 75 of the bumper has sufficient length to prevent full compression of spring 55, i.e., solid compaction of the spring convolutions. This feature minimizes stress on the spring and promotes an increased spring life.

The primary feature of bumper 71 is that it reduces the shock forces generated within the ejector rod, thereby increasing the rod service life. The snubber action of bumper 71 does not interfere with the action of coil spring 55. The spring exerts a leftward bias on the ejector rod so that the rod can rebound leftwardly from the bumper to eject the pintail from the installation tool.

The ejector rod could be a one-piece structure, e.g. a screw machine component machined from round bar stock having a diameter equal to the diameter of guidance head 69. However more material would be required, and more machining would be required. The two-piece ejector rod construction is a cost-reduction expedient.

Obviously, numerous modifications and variations of the present invention are possible in the light of the above teachings. It is therefore to be understood that within the scope of the appended claims, the invention may be practiced otherwise than as specifically described herein.

What is claimed is:

1. A tool for assembling a fastener pin and a fastener collar on a workpiece and for ejecting a severed pintail portion of the pin from said tool, said tool comprising a jaw structure engageable with a portion of the fastener pin and an actuator movable axially away from the pin so that the jaw structure exerts a pulling force on the pin, said tool further comprising an anvil movable over the fastener collar to swage the collar onto the pin, and an ejector means carried by the actuator for ejecting said severed pintail portion of the pin from the jaw structure, said ejector means comprising an axial bore in said actuator, a stop means located in a front portion of the bore, an ejector rod slidably positioned within the bore, a resilient bumper located within the bore, a compression coil spring means extending within the bore, one end of said coil spring means being engaged with the ejector rod so that when said severed pintail portion of the fastener pin forcibly impacts the ejector rod, the coil spring means is compressed and the ejector rod impacts against the resilient bumper, and wherein said resilient bumper has a nose portion extending within the coil spring means so that the ejector rod impacts the bumper before the coil spring means is fully compressed.

2. The tool of claim 1, wherein said bumper is a one-piece elastomeric element.

3. The tool of claim 2, wherein said elastomeric bumper element has a durometer of about ninety on the Shore A scale.

4. The tool of claim 1, wherein the ejector rod is a two-piece structure that includes a cylindrical rod having a threaded end, and an internally threaded sleeve threaded onto the rod threaded end.

5. The tool of claim 1, wherein said bumper is an elongated resilient elastomeric element having a length that is approximately one-half of the ejector rod length.

6. A tool for assembling a fastener pin and a fastener collar on a workpiece and for ejecting a severed pintail portion of the pin from said tool, said tool comprising a jaw structure engageable with a portion of the fastener pin and an actuator movable axially away from the pin so that the jaw structure exerts a pulling force on the pin, said tool further comprising an anvil movable over the fastener collar to swage the collar onto the pin, and an ejector means carried by the actuator for ejecting said severed pintail portion of the pin from the jaw structure, said ejector means comprising an axial bore in said actuator, a stop means located in a front portion of the bore, an ejector rod slidably positioned within the bore, a resilient bumper located within the bore, a compression coil spring means extending within the bore, one end of said coil spring means being engaged with the ejector rod so that when said severed pintail portion of the fastener pin forcibly impacts the ejector rod, the coil spring means is compressed and the ejector rod impacts against the resilient bumper, wherein said ejector rod comprises a guidance head for guiding said ejector rod within said bore, wherein said bumper comprises an elastomeric element having a mounting plug portion seated in the bore and an elongated nose portion extending from the plug portion at a juncture point toward the ejector rod, the juncture point between the plug portion and the nose portion forming an annular shoulder, said coil spring means being disposed between the ejector rod guidance head and the annular shoulder, and wherein said nose portion has a length such that the ejector rod guidance head strikes the nose portion of the bumper before the coil spring means is fully compressed.

7. A tool for assembling a fastener pin and a fastener collar on a workpiece and for ejecting a severed pintail portion of said pin from said tool, said tool comprising a jaw structure engageable with a portion of said pin and an actuator movable axially away from said pin so that said jaw structure exerts a pulling force on said pin, said tool further comprising an anvil movable over said collar to swage said collar onto said pin, and an ejector means carried within said tool for ejecting said severed pintail portion of said pin from said jaw structure, said ejector means comprising an ejector rod slidably positioned within said tool, a resilient bumper engageable with said ejector rod, and a compression coil spring means for biasing said ejector rod toward said jaw structure, so that when said severed pintail portion of said fastener pin forcibly impacts said ejector rod, said coil spring means is compressed and the ejector rod impacts against the resilient bumper, said coil spring means having an end portion extending axially adjacent to said bumper so that said ejector rod impacts said bumper before said coil spring means is fully compressed.

* * * * *

UNITED STATES PATENT AND TRADEMARK OFFICE

CERTIFICATE OF CORRECTION

PATENT NO. : 5,119,554

DATED : June 9, 1992

INVENTOR(S) : Robert B. Wilcox

It is certified that error appears in the above-indentified patent and that said Letters Patent is hereby corrected as shown below:

Column 3, line 47, after "Fig." first occurrence, insert --1--.

Signed and Sealed this

Nineteenth Day of October, 1993

Attest:

BRUCE LEHMAN

*Attesting Officer* *Commissioner of Patents and Trademarks*